United States Patent
Kim et al.

(10) Patent No.: US 11,308,140 B2
(45) Date of Patent: Apr. 19, 2022

(54) ELECTRONIC DEVICE FOR GENERATING NATURAL LANGUAGE RESPONSE AND METHOD THEREOF

(71) Applicant: Samsung Electronics Co., Ltd., Suwon-si (KR)

(72) Inventors: Hannam Kim, Suwon-si (KR); Eunchung Noh, Suwon-si (KR); Kwanho Lee, Suwon-si (KR); Yeseul Lee, Suwon-si (KR); Jisun Choi, Suwon-si (KR); Namkoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 16/845,725

(22) Filed: Apr. 10, 2020

(65) Prior Publication Data
US 2020/0327155 A1    Oct. 15, 2020

(30) Foreign Application Priority Data
Apr. 10, 2019   (KR) .................. 10-2019-0041811

(51) Int. Cl.
  *G06F 16/33*      (2019.01)
  *G06F 40/40*      (2020.01)
  *G06F 40/56*      (2020.01)
  *G06F 16/332*     (2019.01)
  *G06F 40/186*     (2020.01)

(52) U.S. Cl.
  CPC ...... *G06F 16/3344* (2019.01); *G06F 16/3329* (2019.01); *G06F 40/186* (2020.01); *G06F 40/40* (2020.01); *G06F 40/56* (2020.01)

(58) Field of Classification Search
  CPC ............ G06F 16/3344; G06F 16/3329; G06F 16/24578; G06F 16/243; G06F 40/40; G06F 40/56; G06F 3/167
  See application file for complete search history.

(56) References Cited

U.S. PATENT DOCUMENTS

| | | |
|---|---|---|
| 9,607,035 B2 | 3/2017 | Allen et al. |
| 2013/0238624 A1 | 9/2013 | Lee et al. |
| 2016/0379106 A1 | 12/2016 | Qi et al. |
| 2017/0177715 A1* | 6/2017 | Chang ............ G06N 5/04 |

(Continued)

FOREIGN PATENT DOCUMENTS

| | | |
|---|---|---|
| EP | 3 392 876 A1 | 10/2018 |
| KR | 10-2007-0061188 A | 6/2007 |

(Continued)

OTHER PUBLICATIONS

International Search Report dated Aug. 6, 2020, issued in International Application No. PCT/KR2020/004882.

*Primary Examiner* — Matthew J Ellis
(74) *Attorney, Agent, or Firm* — Jefferson IP Law, LLP

(57) ABSTRACT

An electronic device is provided. The electronic device includes an output device, at least one processor operatively connected to the output device, and a memory operatively connected to the at least one processor. The memory may store instructions that cause at least one processor to output a natural language response based on main information selected from raw data depending on a context. Other various embodiments as understood from the specification are also possible.

18 Claims, 17 Drawing Sheets

(56) References Cited

U.S. PATENT DOCUMENTS

| | | |
|---|---|---|
| 2017/0193350 A1 | 7/2017 | Allen et al. |
| 2019/0034500 A1* | 1/2019 | Das ........................ G06N 5/022 |
| 2019/0121802 A1* | 4/2019 | Venkataraman ............................ G06F 16/24578 |
| 2019/0266166 A1* | 8/2019 | Venkataraman ............................ H04N 21/42203 |
| 2019/0272296 A1* | 9/2019 | Prakash ................ G06F 16/243 |
| 2020/0012650 A1* | 1/2020 | Fan ................... G06F 16/24573 |

FOREIGN PATENT DOCUMENTS

| | | |
|---|---|---|
| KR | 10-1263403 B1 | 5/2013 |
| KR | 10-2016-0104145 A | 9/2016 |

\* cited by examiner

| DAILY TEMPERATURE RANGE | FINE DUST | WEATHER AT 18:00 | HUMIDITY | DAILY TEMPERATURE RANGE | UV INDEX |
|---|---|---|---|---|---|
| diff≥9 FIRST PRIORITY | Level==4 FIRST PRIORITY | RAINY FIRST PRIORITY | 70 OR MORE FIRST PRIORITY | 50 OR MORE FIRST PRIORITY | 5(extreme) FIRST PRIORITY |
| 9>diff≥7 FIRST PRIORITY | Level==3 SECOND PRIORITY | SNOW FIRST PRIORITY | 60-70 SECOND PRIORITY | 30-50 SECOND PRIORITY | 4(very high) FIRST PRIORITY |
| 7>diff≥5 SECOND PRIORITY | Level==2 THIRD PRIORITY | SUNNY FOURTH PRIORITY | 50-60 THIRD PRIORITY | 20-30 SECOND PRIORITY | 3(high) SECOND PRIORITY |
| 5>diff≥3 THIRD PRIORITY | Level==1 FOURTH PRIORITY | | 40-50 FOURTH PRIORITY | 10-20 SECOND PRIORITY | 2(moderate) FOURTH PRIORITY |
| 3>diff FIRST PRIORITY | | | 30-40 THIRD PRIORITY | 1-10 THIRD PRIORITY | 1(low) SECOND PRIORITY |
| | | | 0-30 FIRST PRIORITY | 0-1 FOURTH PRIORITY | |

FIG. 7

ELECTRONIC DEVICE FOR GENERATING NATURAL LANGUAGE RESPONSE AND METHOD THEREOF

CROSS-REFERENCE TO RELATED APPLICATION(S)

This application is based on and claims priority under 35 U.S.C. § 119(a) of a Korean patent application number 10-2019-0041811, filed on Apr. 10, 2019, in the Korean Intellectual Property Office, the disclosure of which is incorporated by reference herein its entirety.

BACKGROUND

1. Field

The disclosure relates to an interactive user interface (UI) technology of an electronic device.

2. Description of Related Art

An interactive UI technology includes a technology required for a series of processes that provide information to a user or generate a sentence required for a conversation to output a voice or text through an output device, such as a speaker, a display device, or the like.

There is an interactive voice interface system as an example of an electronic device to which the interactive UI technology is applied. In the interactive voice interface system, the electronic device receives the voice of a human through an input device, such as a microphone or the like and then converts the voice into a text. Furthermore, the interactive voice interface system grasps the intent of a user utterance from the converted text and then generates a sentence according to the grasped intent.

The above information is presented as background information only to assist with an understanding of the disclosure. No determination has been made, and no assertion is made, as to whether any of the above might be applicable as prior art with regard to the disclosure.

SUMMARY

The interactive UI technology only outputs a uniform response to the same event. Embodiments disclosed in this specification are to provide an electronic device and a method dynamically providing a user with a response more suitable for a user's context.

Furthermore, an electronic device or method to which an interactive UI technology is applied may collect information for generating a response to an event requiring a response and then may generate a response based on the collected information. Here, it is need to generate a response including an appropriate amount of information among the collected information. Furthermore, it is need to select useful information for the user among the collected information. Embodiments disclosed in this specification are to provide an electronic device and a method providing a user with a response including the appropriate amount of information that is useful.

Aspects of the disclosure are to address at least the above-mentioned problems and/or disadvantages and to provide at least the advantages described below. Accordingly, an aspect of the disclosure is to provide an electronic device and a method dynamically providing a user with a response more suitable for a user's context.

Additional aspects will be set forth in part in the description which follows and, in part, will be apparent from the description, or may be learned by practice of the presented embodiments.

In accordance with an aspect of the disclosure, an electronic device is provided. The electronic device includes an output device, at least one processor operatively connected to the output device, and a memory operatively connected to the at least one processor. The memory may store instructions that, when executed, cause the at least one processor to detect an occurrence of an event, to determine a query corresponding to the event in response to the occurrence of the event, to obtain raw data based on at least part of the determined query, to determine a main information condition table for defining a condition for selecting data, based on context information associated with the event, to select main information from the obtained raw data, based on the main information condition table, and to output a natural language response generated based on the selected main information, through the output device.

In accordance with another aspect of the disclosure, a method in which an electronic device provides a natural language response is provided. The method includes detecting an occurrence of an event, determining a query corresponding to the event as a response to the occurrence of the event, obtaining raw data based on at least part of the query, determining a main information condition table for defining a condition for selecting data based on context information associated with the event, selecting main information from the raw data, based on the main information condition table, and outputting a natural language response generated based on the selected main information.

In accordance with another aspect of the disclosure, a non-transitory computer-readable recording medium having recorded thereon a computer program for executing a method is provided. The non-transitory computer-readable recording medium includes detecting an occurrence of an event, determining a query corresponding to the event as a response to the occurrence of the event, obtaining raw data based on at least part of the query, determining a main information condition table for defining a condition for selecting data based on context information associated with the event, selecting main information from the raw data, based on the main information condition table, and outputting a natural language response generated based on the selected main information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates a main information condition table according to an embodiment of the disclosure;

Throughout the drawings, like reference numerals will be understood to refer to like parts, components, and structures

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
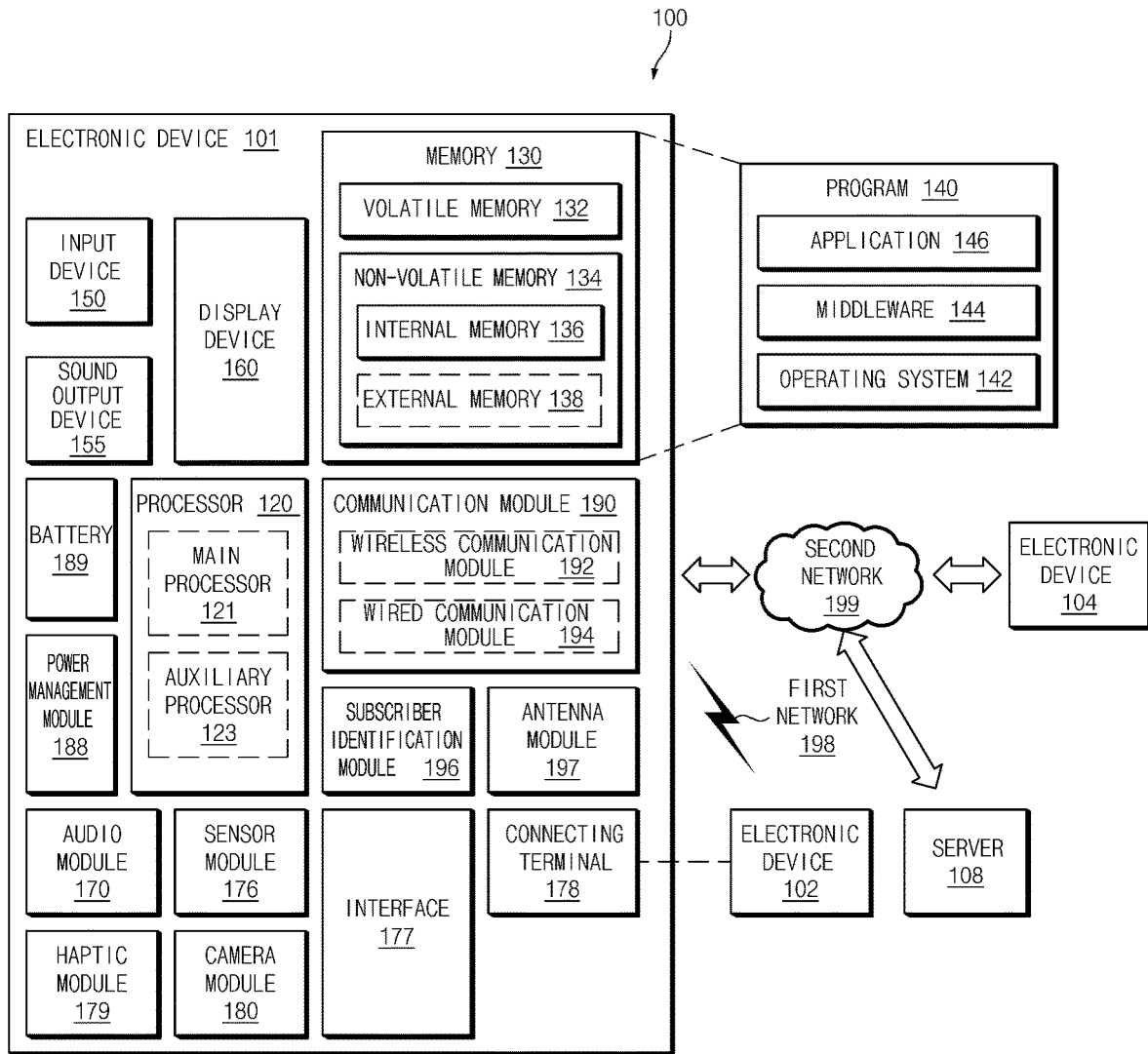
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
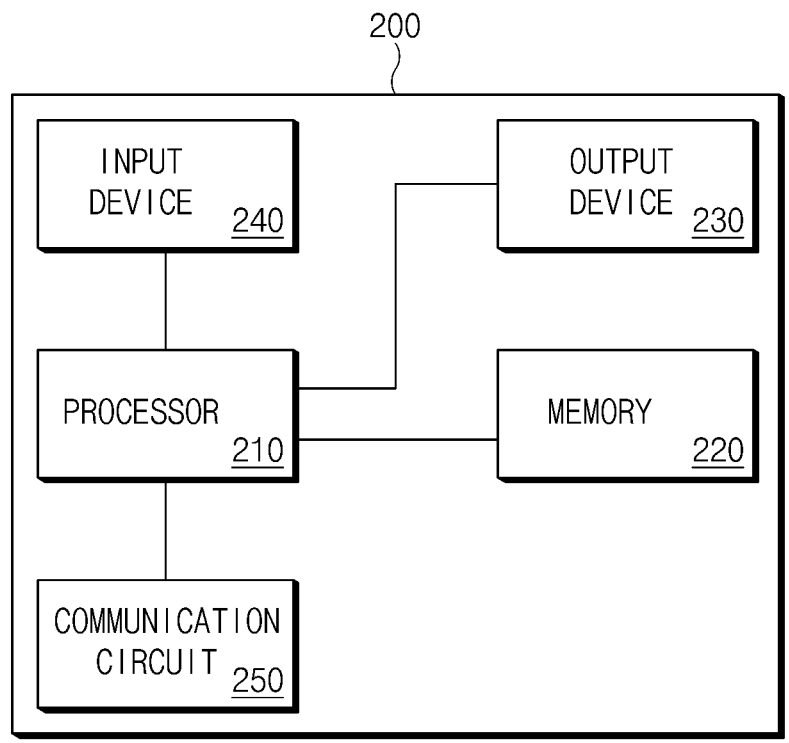
FIG. 2 illustrates a configuration of an electronic device according to an embodiment of the disclosure.

FIG. 2 illustrates a configuration of an electronic device according to an embodiment of the disclosure.

Referring to FIG. 2, according to an embodiment of the disclosure, an electronic device 200 may include a processor 210, a memory 220, and an output device 230. The processor 210 (e.g., the processor 120 of FIG. 1) may be electrically connected to the components of the electronic device 200. Furthermore, the processor 210 may control the components of the electronic device 200 or may process data, by executing instructions loaded onto the memory 220 (e.g., the memory 130 of FIG. 1). In this specification, it may be understood that the operation of the processor 210 or the electronic device 200 is performed as the processor 210 executes instructions stored in the memory 220.

According to an embodiment of the disclosure, when an event occurs, the processor 210 may determine a query corresponding to the event. The occurrence of the event may mean that a condition that allows the electronic device 200 to start an operation of outputting a response is satisfied. Furthermore, a query may mean a computer language for making a request for information corresponding to the occurring event. For example, when a natural language input of "I have no schedule today. What should I do?", the electronic device 200 may determine a query for searching for information, such as weather, broadcasting program schedules, leisure activities, sports or film screening information, and the like.

The electronic device 200 according to an embodiment may further include an input device 240. The input device 240 (e.g., the input device 150 of FIG. 1) may refer to a device capable of receiving information. According to an embodiment of the disclosure, the occurrence of an event may mean that a natural language input for making a request for a response is performed through the input device 240.

In this specification, the natural language input includes information corresponding to the language that humans are capable of understanding; the natural language input may refer to an input having a form (e.g., a text or voice) capable of being received by the electronic device 200. For example, an event may occur in which the electronic device 200 receives a voice including a wake-up utterance and command utterance through a microphone. Here, the wake-up utterance may mean a voice including a word that causes the electronic device 200 to receive a command utterance. The command utterance may refer to a voice that is received after a wake-up utterance and includes a word for instructing the electronic device 200 to perform an operation. For example, when the electronic device 200 receives a voice of "Bixby, how is the weather today", "Bixby" may be a wake-up utterance and "how is the weather today" may be a command utterance.

For another example, an event in which the electronic device 200 receives a text written in a natural language through a keyboard may occur. For example, the electronic device 200 may receive a text input for a running chatbot application.

According to another embodiment of the disclosure, the electronic device 200 may further include a sensor module (e.g., the sensor module 176 of FIG. 1) that detects an operating state of the electronic device 200 or an external environmental state. The occurrence of an event according to an embodiment may mean that a specified sensing value is detected through a sensor module. For example, the occurrence of an event may mean that a moving object is detected at a specified time (e.g., morning time or within a specified period after an alarm occurs).

According to another embodiment of the disclosure, the occurrence of an event may mean that a condition associated with the electronic device 200 or the user of the electronic device 200 is satisfied. For example, in the specification, when a user registers a schedule indicating that the user wants to go out, in a schedule management application installed in the electronic device 200, a case where the time before the time (e.g., 1 hour) set to the start time of the registered schedule is reached may be regarded as an event occurs.

According to an embodiment of the disclosure, the processor 210 may determine the main information condition table based on the context information associated with the event that has occurred. The context information may indicate information associated with an event that has occurred. For example, the context information may include information about a point in time when an event occurred. For another example, the context information may include information about the season to which a point in time when an event occurred belongs. For still another example, the context information may include user information indicating a feature of the user associated with the event. For example, the user information may mean information, such as the user's age, personality, hobby, or occupation. For another example, the context information may include place information indicating the location of the electronic device.

The main information condition table may be data including values defining conditions for selecting data. According to an embodiment of the disclosure, the memory 220 may store a plurality of candidate condition tables. The candidate condition tables stored in the memory 220 may define different conditions for selecting data. The processor 210 according to an embodiment may select one of a plurality of candidate condition tables as a main information condition table based on the context information. For example, when the context information includes time information indicating winter and morning time, the processor 210 may select a candidate condition table applied to the winter and the morning time as the main information condition table.

According to an embodiment of the disclosure, the electronic device 200 may further include a communication circuit 250 (e.g., the communication module 190 of FIG. 1) for communicating with another device (e.g., the electronic device 102, the electronic device 104, or the server 108 of FIG. 1). According to an embodiment of the disclosure, the electronic device 200 may transmit a query to another device (or an external device) through the communication circuit 250. The electronic device 200 may obtain raw data from the response to a query. However, embodiments of the disclosure are not limited thereto. For example, the electronic device 200 may search for the raw data from data stored in the memory 220, using the query.

According to an embodiment of the disclosure, the processor 210 may select main information from the raw data obtained using the main information condition table, based on the query. When the main information is selected, the processor 210 may generate a natural language response based on the selected main information and then may output the generated natural language response through the output device 230. In this specification, the natural language response may indicate the output of the electronic device 200 that is output in the form of a language capable of being understood by a human. For example, the processor 210 may output a voice corresponding to a sentence written in a natural language through a speaker (e.g., the sound output device 155 of FIG. 1). For another example, the processor 210 may output a text through a display device (e.g., the display device 160 of FIG. 1).

Figure 3:
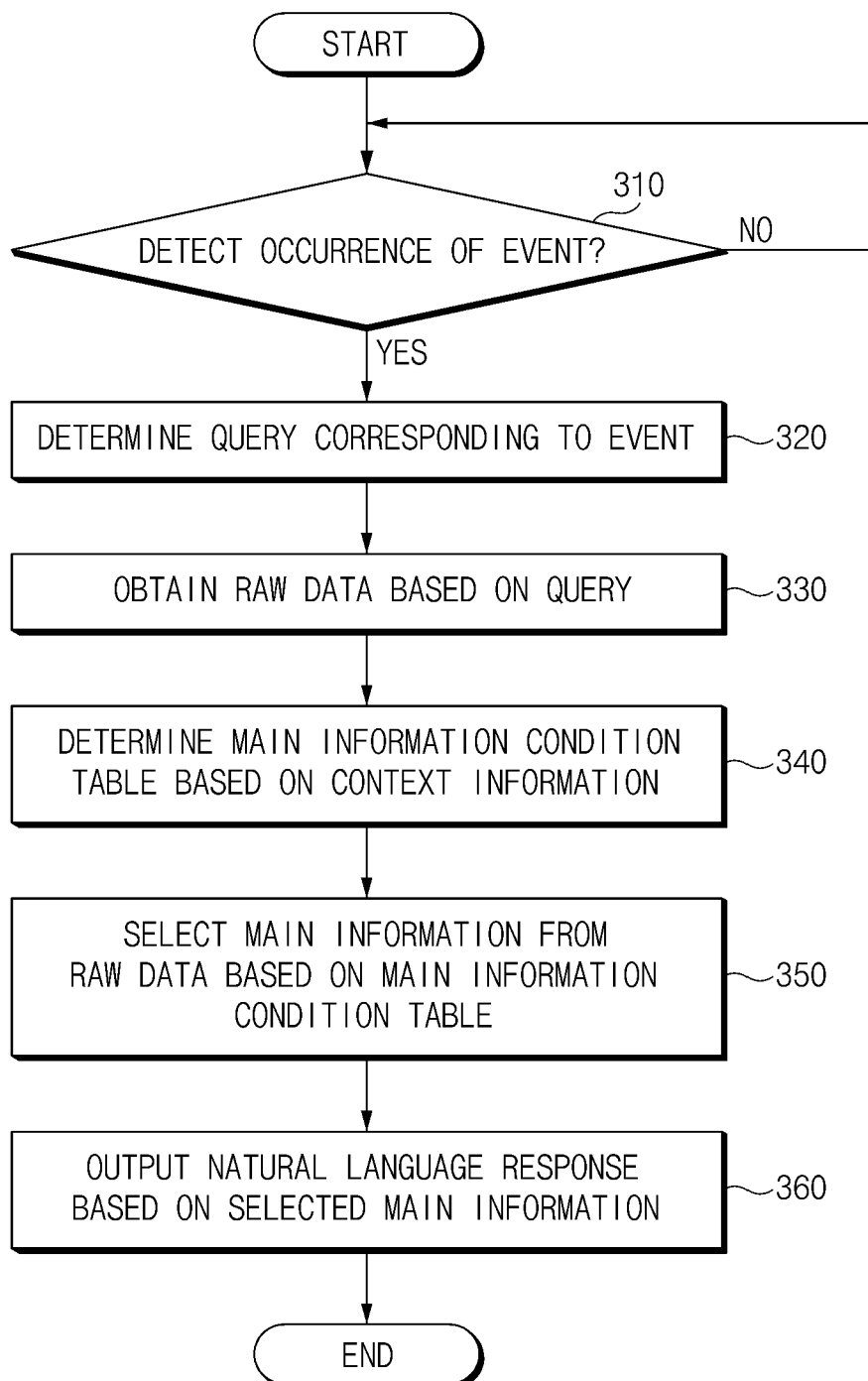
FIG. 3 is a flowchart illustrating a process in which an electronic device provides a natural language response according to an embodiment of the disclosure.

FIG. 3 is a flowchart illustrating a process in which an electronic device 200 provides a natural language response according to an embodiment of the disclosure.

Referring to FIG. 3, the electronic device 200 according to an embodiment may perform operation 310 of detecting whether an event requiring a response occurs. Detecting the event may mean obtaining a signal capable of being recognized by the electronic device 200. For example, when the electronic device 200 receives a natural language input requiring a response through an input device, the electronic device 200 may detect the event requiring the occurrence of a response. For another example, the electronic device 200 may detect an event in response to information received through a communication circuit. For still another example, the electronic device 200 may detect the occurrence of an event based on the signal detected through a sensor. For yet another example, the electronic device 200 may detect the occurrence of an event based on whether a condition associated with a user of the electronic device 200 is satisfied.

When the occurrence of an event is detected in operation 310, the electronic device 200 according to an embodiment may perform operation 320 of determining a query corresponding to the detected event. According to an embodiment of the disclosure, in operation 320, the electronic device 200 may determine an address (e.g., Uniform Resource Locator (URL)) for making a request for information corresponding to the event.

Afterward, the electronic device 200 according to an embodiment may perform operation 330 of obtaining raw data based on the determined query. For example, the electronic device 200 may access a server using the request URL corresponding to the event and may obtain an electronic document (e.g., a document in JSON format or HTML format) corresponding to the URL from a server. The electronic device 200 may obtain the raw data by parsing the obtained electronic document.

Furthermore, the electronic device 200 according to an embodiment may perform operation 340 of determining a main information condition table based on context information. In FIG. 3, it is illustrated that operation 340 is performed after operation 330, but is not limited thereto. The operation 340 may be performed separately from whether operation 330 is performed. For example, operation 340 may be performed in parallel with operation 330; alternatively, operation 340 may be performed before operation 330.

According to an embodiment of the disclosure, the electronic device 200 may perform operation 350 of selecting main information from the obtained raw data based on the determined main information condition table. Afterward, the electronic device 200 may generate a natural language response based on the selected main information. The electronic device 200 may perform operation 360 of outputting the generated natural language response through the output device.

Figure 4:
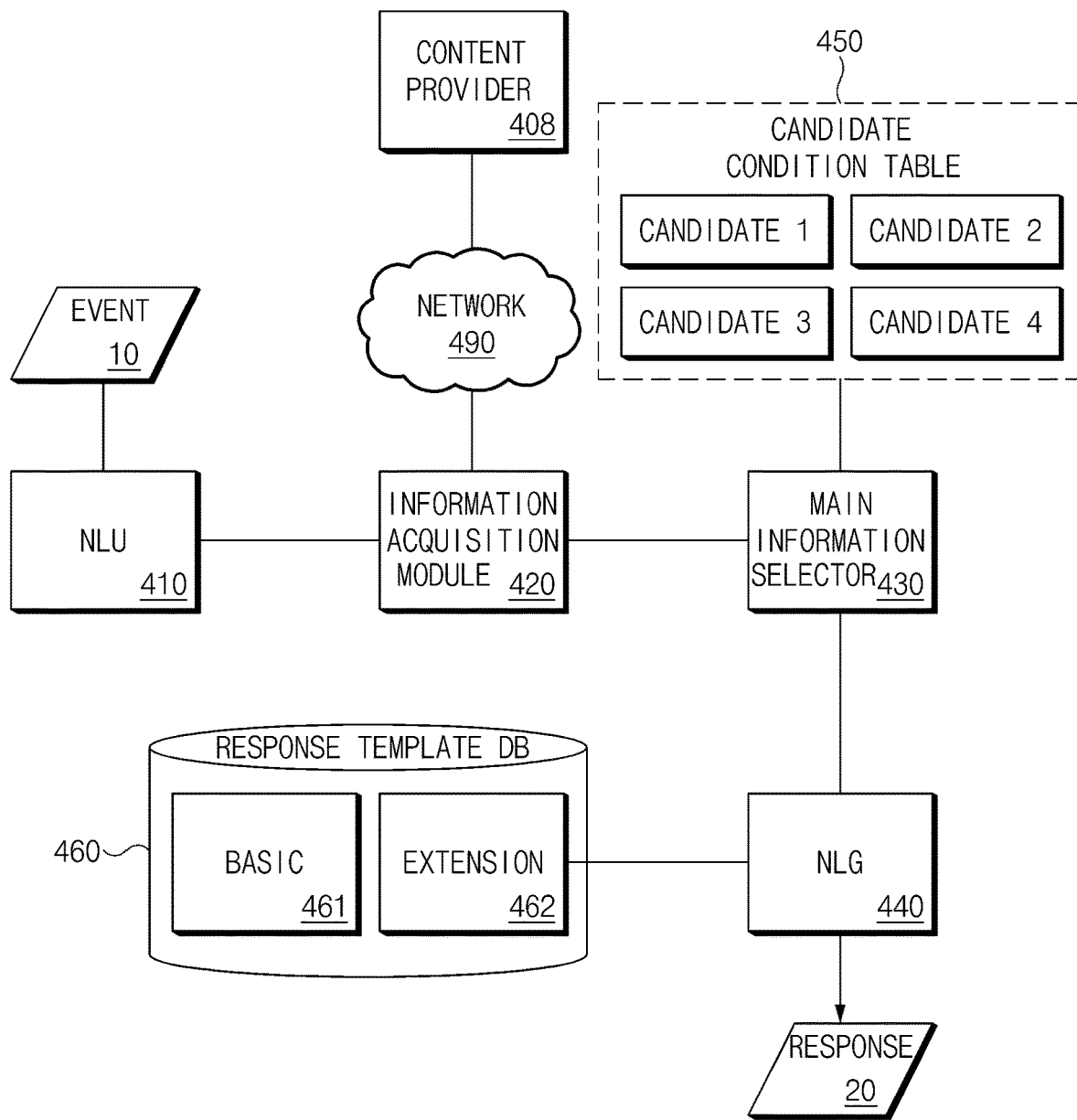
FIG. 4 illustrates a configuration for an electronic device to provide a natural language response, for each module according to an embodiment of the disclosure.

FIG. 4 illustrates a configuration for the electronic device 200 to provide a natural language response, for each module according to an embodiment of the disclosure.

Referring to FIG. 4, it illustrates an embodiment for the case where an event 10 is receiving a natural language input.

The electronic device 200 according to an embodiment may be configured to include a NLU module 410, an information acquisition module 420, a main information selector 430, and a natural language generator (NLG) 440. The module illustrated in FIG. 4 may be implemented using at least one of the components illustrated in FIG. 1 or 2. For example, each of the modules 410, 420, 430, and 440 illustrated in FIG. 4 may be implemented as the processor 210 of FIG. 2 executes the instructions stored in the memory 220.

According to an embodiment of the disclosure, when an event 10 that a natural language input having the form of a voice is received occurs, the NLU module 410 may convert the received natural language input into text-type data capable of being understood by a computer.

The information acquisition module 420 according to an embodiment may determine a query for obtaining information based on the text-type data converted from the natural language input received by the NLU module 410. Furthermore, the information acquisition module 420 may communicate with a content provider 408 (e.g., the electronic device 102, the server 108, or the electronic device 104 of FIG. 1) through a network 490 (e.g., the first network 198 or the second network 199 of FIG. 1). The information acquisition module 420 according to an embodiment may transmit an information request to the content provider 408 based on the determined query. The information acquisition module 420 may receive information as the response to the information request from the content provider 408 and may obtain raw data including the received information.

According to an embodiment of the disclosure, the main information selector 430 may select main information among information included in the raw data. According to an embodiment of the disclosure, the main information selector 430 may select main information from the raw data using a main information condition table. Here, the main information selector 430 may select at least one of candidate condition tables 450 as a main information condition table. Here, the candidate condition tables 450 may be stored in a storage medium. For example, the candidate condition tables 450 may be stored in the memory 220 of FIG. 2 or another device (e.g., the electronic device 102, the electronic device 104, or the server 108 of FIG. 1). According to an embodiment of the disclosure, the main information selector 430 may determine the main information condition table depending on the context information associated with the event.

According to another embodiment of the disclosure, the main information selector 430 may select main information based on an information item selected by the user directly from an information list. The information selected by the user may always be included in the response. For example, the main information selector may set the priority of the information item selected by a user among a plurality of information items included in the information list, as the first priority. The number of selectable information items may be equal to or less than the number of information items capable of being included in the response. When the number of selected information items is smaller than the maximum number of information items capable of being included, the main information selector may additionally select the information of the information item having the highest priority other than the selected pieces of information, as main information.

According to another embodiment of the disclosure, the main information selector 430 may dynamically generate a main information condition table depending on the context information.

According to an embodiment of the disclosure, the NLG 440 may generate a natural language response 20 including the selected main information. According to an embodiment of the disclosure, the NLG 440 may generate the natural language response 20, using the response template stored in the response template database 460. According to an embodiment of the disclosure, the response template database 460 may be stored in the memory (e.g., the memory 220 of FIG. 2) of the electronic device 200.

According to an embodiment of the disclosure, the response template database 460 may include a basic template 461 and an extension template 462. The NLG 440 may generate a basic response including information corresponding to the event 10 based on the basic template 461 and may generate an extension response including main information based on the extension template 462. The NLG 440 may output the natural language response 20 including the basic response and the extension response. The natural language response 20 may include a basic response and one or more extension responses. Alternatively, the natural language response 20 may not include the extension response.

Figure 5:
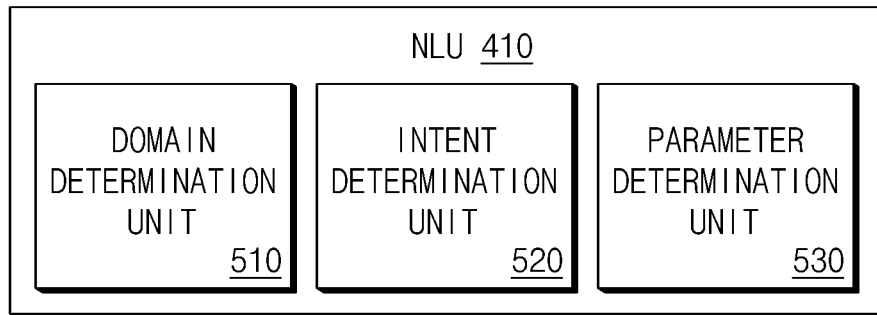
FIG. 5 illustrates a configuration of a natural language understanding (NLU) module of an electronic device according to an embodiment of the disclosure.

FIG. 5 illustrates a configuration of an NLU module of an electronic device according to an embodiment of the disclosure. The NLU module 410 according to an embodiment may include a domain determination unit 510, an intent determination unit 520, and a parameter determination unit 530.

Referring to FIG. 5, the domain determination unit 510 analyzes a natural language input to determine a domain capable of processing a natural language response. The intent determination unit 520 may determine the intent corresponding to the natural language input based on at least one of the natural language input and the determined domain. The parameter determination unit 530 may determine a parameter for executing a function corresponding to the intent, based on at least one or more of the natural language input, the determined domain, and the determined intent. The parameter determined by the parameter determination unit 530 may be used to generate a query by the information acquisition module 420.

Figure 6:
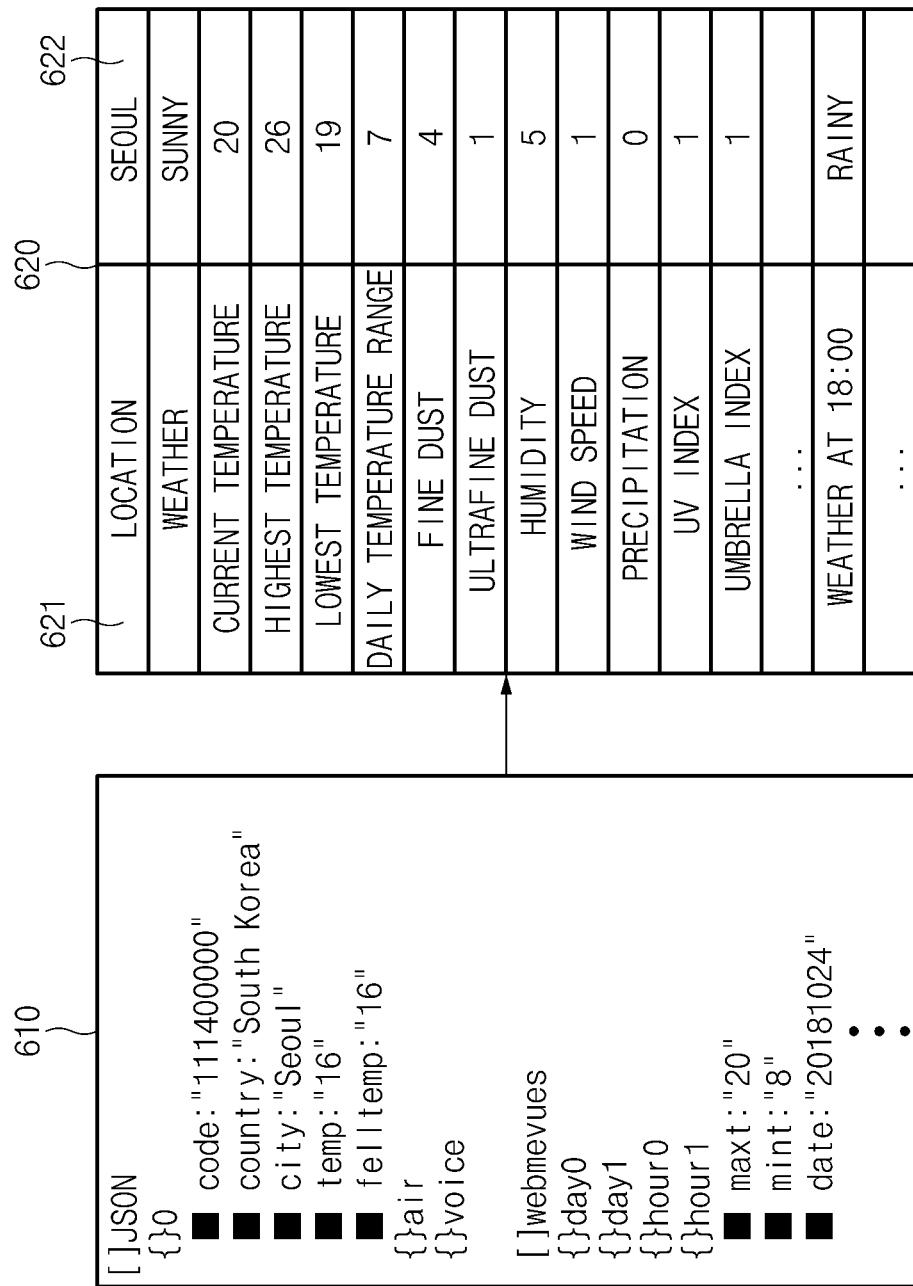
FIG. 6 illustrates a process in which an electronic device obtains raw data according to an embodiment of the disclosure.

FIG. 6 illustrates a process in which an electronic device obtains raw data according to an embodiment of the disclosure.

Referring to FIG. 6, according to an embodiment of the disclosure, the electronic device 200 may receive an electronic document 610 including information corresponding to a query from a content provider based on the query corresponding to an event that has occurred. The electronic document 610 may be implemented in various formats according to an embodiment.

The electronic device 200 according to an embodiment may parse the electronic document 610 to obtain raw data 620. According to an embodiment of the disclosure, the raw data 620 may include a data field 621, such as 'location', 'weather', 'current temperature', 'highest temperature', or the like and values 622 of the data field, such as 'Seoul', 'sunny', '20', '26', and the like.

FIG. 7 illustrates a main information condition table according to an embodiment of the disclosure.

Referring to FIG. 7, a main information condition table 750 according to an embodiment may include at least one data field item 751 and a priority determination condition 752 corresponding to the at least one data field item 751.

The main information condition table 750 illustrated in FIG. 7 may include the data field item 751, such as 'daily temperature range', 'fine dust', 'weather at 18:00', 'humidity', 'precipitation', and 'ultra-violent (UV) Index'. Furthermore, the main information condition table 750 shown in FIG. 7 may include a condition statement for determining whether a value is within the specified range such that a priority is capable of being determined depending on the range to which the value of data field item 751 belongs and a priority determination condition 752 that specifies the priority of the value (or information) in the case where the value is within the specified range.

The electronic device 200 according to an embodiment may determine the priority by comparing the information included in the raw data with the priority determination condition 752. For example, when the raw data has the data field of 'daily temperature range' that is '7', because '7' is within the range of '9>diff=7' of the priority determination condition 752, the electronic device 200 may determine the priority of '7', which is the value of 'daily temperature range data field' of raw data, as the first priority.

However, the main information condition table 750 is not limited to the form shown in FIG. 7. For example, the main information condition table 750 may include a function that outputs a priority score by inputting a value corresponding to the data field item 751, instead of the priority determination condition 752 illustrated in FIG. 7.

Figure 8:
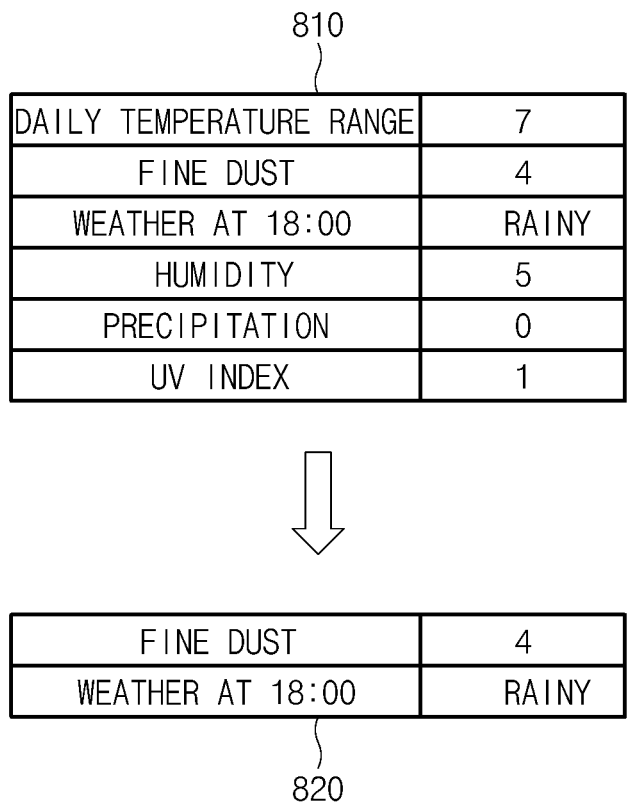
FIG. 8 illustrates a main information candidate list and selected main information, which are determined by an electronic device according to an embodiment of the disclosure.

FIG. 8 illustrates a main information candidate list and selected main information, which are determined by the electronic device according to an embodiment of the disclosure.

Referring to FIG. 8, the electronic device 200 may select pieces of information corresponding to a data field item of a main information condition table among raw data, a main information candidate list 810.

Referring to FIGS. 6, 7 and 8, because the main information condition table 750 of FIG. 7 has 'daily temperature range', 'fine dust', 'weather at 18:00', 'humidity', 'precipitation', and 'UV Index' as data field item 751 of FIG. 7, the electronic device 200 may select the values of fields, such as 'daily temperature range', 'fine dust', 'weather at 18:00', 'humidity', 'precipitation', and 'UV Index' among pieces of information of the raw data of 620 of FIG. 6, as the main information candidate list 810.

The electronic device 200 may determine the priority by comparing the values included in the main information candidate list 810 with the priority determination condition 752 of FIG. 7 in the main information condition table 750 of FIG. 7. Afterward, the electronic device 200 may determine main information 820 based on the determined priority. For example, when information about 'fine dust' and 'weather at 18:00' has the first priority and information about other fields has a priority equal to or less than the second priority, the electronic device 200 may determine pieces of item information about 'fine dust' and 'weather at 18:00', as the main information 820.

Figure 9:
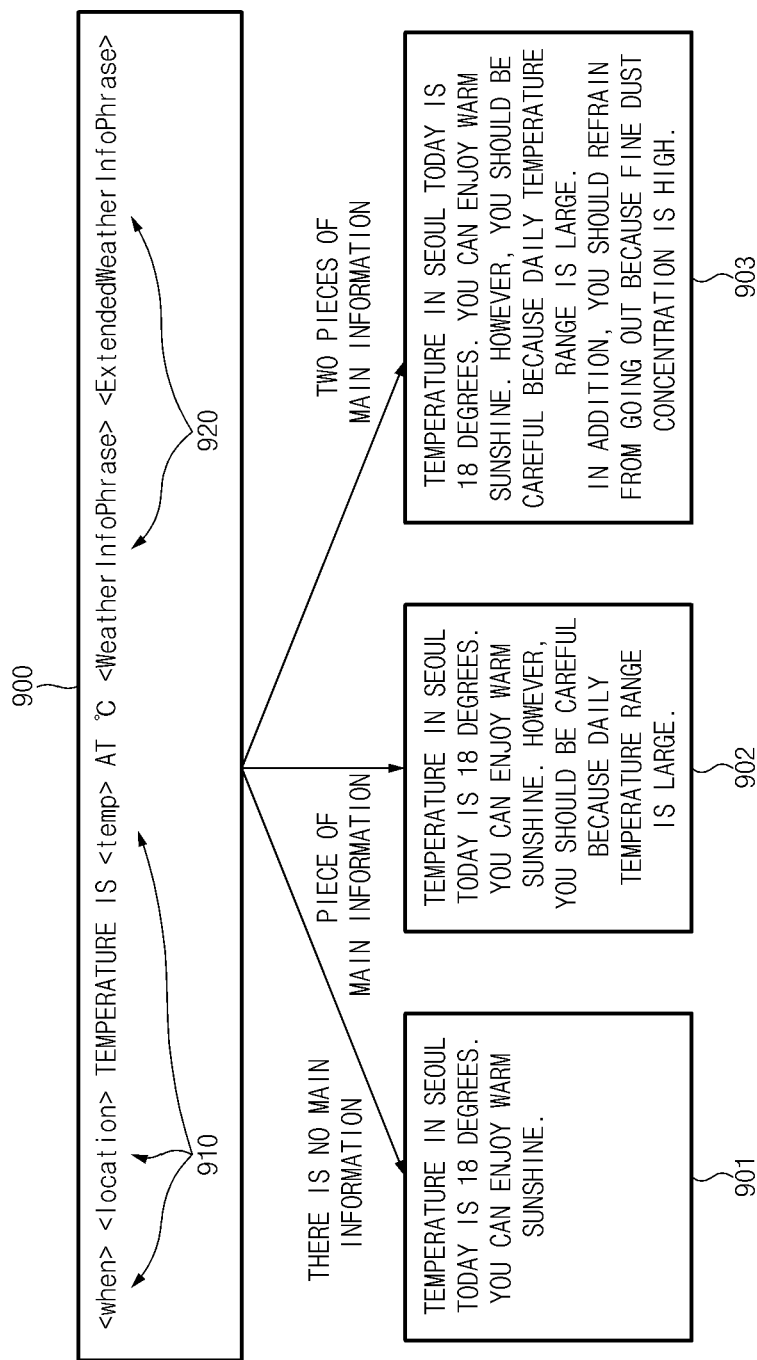
FIG. 9 illustrates an electronic device generating a natural language response depending on a number of items of main information selected using a response template according to an embodiment of the disclosure.

FIG. 9 illustrates an electronic device generating a natural language response depending on a number of items of main information selected using a response template according to an embodiment of the disclosure.

Referring to FIG. 9, according to an embodiment of the disclosure, the electronic device 200 may generate a natural language response using the response template 900 stored in the response template database 460 of FIG. 4. According to an embodiment of the disclosure, the electronic device 200 may select a response template to be used to generate a natural language response based on at least one of the domain of an event or intent among templates stored in the response template database 460 of FIG. 4.

According to an embodiment of the disclosure, the response template 900 may include a value token 910 and a template token 920. The value token 910 may indicate a token replaced with a specified information value. Furthermore, the template token 920 may indicate a token branched depending on main information or user information. The template token 920 may generate a partial sentence; in some cases, the template token 920 may have another template token.

The electronic device 200 may output a natural language response that is different depending on the main information, using the response template 900. Referring to FIG. 9, when a natural language response to the user's utterance of "How's the weather in Seoul today?" is generated, in the case where there is no main information selected in an operation of selecting main information (e.g., operation 350 of FIG. 3), the electronic device 200 may output a response 901 obtained by inputting the specified information into the value token 910. Alternatively, when the information about 'daily temperature range' is included in the main information (when there is a single field (item) of the main information), the electronic device 200 may input the specified information into the value token 910 and may output a response 902, which is obtained by inputting the partial sentence associated with the main information, to the template token 920. For another example, when the information about the 'daily temperature range' and the 'air quality' are included in the main information (when there are two fields of the main information), the electronic device 200 may output a response 903 including two partial sentences.

Accordingly, because the electronic device 200 may determine a main information condition table that is a criterion for selecting main information depending on context information and may output a response according to the selected main information based on the main information condition table, it is possible to allow the electronic device 200 to output a response different depending on the context even with respect to the same event (e.g., the same utterance).

Figure 10:
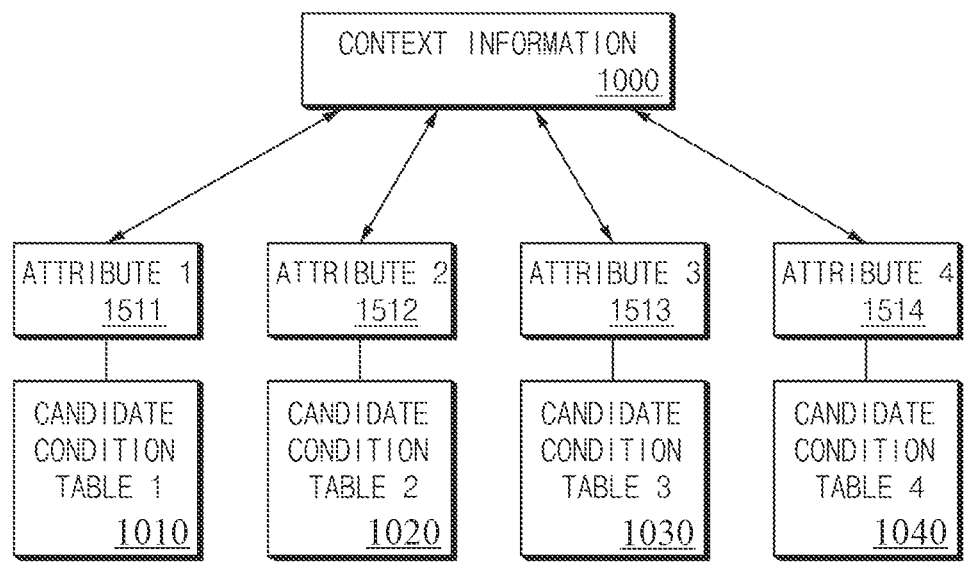
FIG. 10 illustrates a method in which an electronic device selects a main information condition table from candidate condition tables according to an embodiment of the disclosure.

FIG. 10 illustrates a method in which an electronic device selects a main information condition table from candidate condition tables according to an embodiment of the disclosure.

Referring to FIG. 10, according to an embodiment of the disclosure, the electronic device 200 may obtain the context information 1000 in various manners. For example, the electronic device 200 may obtain user information stored in a memory, may obtain information about an event occurrence time, or may obtain information about the location of the electronic device 200.

According to an embodiment of the disclosure, the memory 220 of the electronic device 200 may store pieces of attribute information 1511, 1512, 1513, and 1514 corresponding to candidate condition tables 1010, 1020, 1030, and 1040, respectively. The pieces of attribute information 1511, 1512, 1513, and 1514 may mean information about features set for the candidate condition tables 1010, 1020, 1030, and 1040 respectively. For example, the pieces of attribute information 1511, 1512, 1513, and 1514 may include features, such as a candidate condition table selected in summer, a candidate condition table selected when a user is an adult male, a candidate condition table selected in the morning, a candidate condition table selected in Korea, and the like. According to an embodiment of the disclosure, the electronic device 200 may compare the context information and the pieces of attribute information 1511, 1512, 1513, and 1514. According to the comparison result, the electronic device 200 may select the main information condition table from the candidate condition table. For example, the electronic device 200 may calculate the correlation between context information and pieces of attribute information 1511, 1512, 1513, and 1514 and may select a candidate condition table with the high correlation with the pieces of attribute information as the main information condition table. In another example, when attribute information defines a range, such as a range between 6 am and 9 am and context information is included in the range of the attribute information, the electronic device 200 may select a candidate condition table having the attribute information, as the main information condition table.

Figure 11:
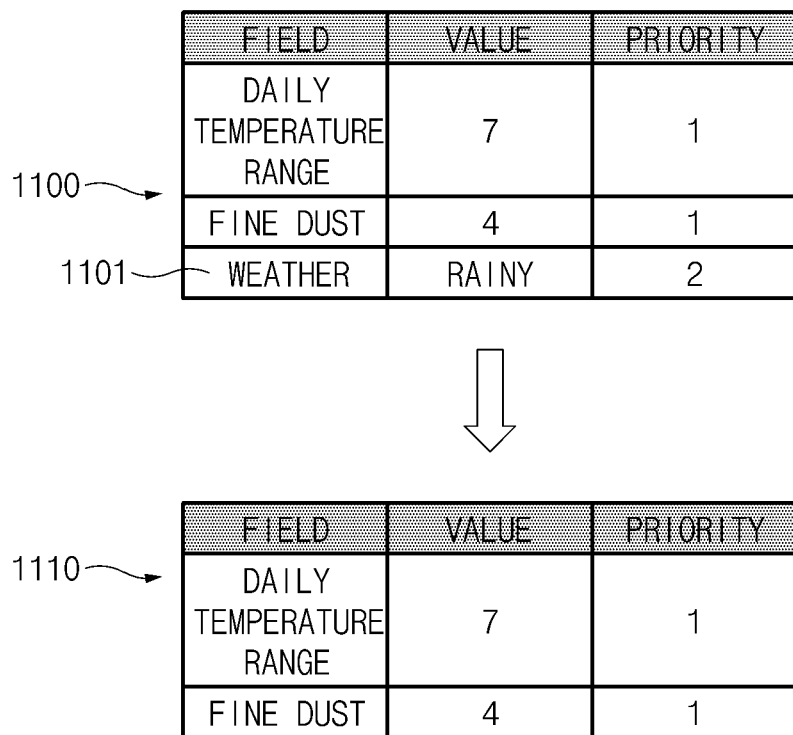
FIG. 11 illustrates a method in which an electronic device excludes a value of a field depending on a priority in main information according to an embodiment of the disclosure.

FIG. 11 illustrates a method in which an electronic device excludes a value of a field depending on a priority in main information according to an embodiment of the disclosure.

Referring to FIG. 11, according to an embodiment of the disclosure, the electronic device 200 may exclude some values among the plurality of items (fields) of the main information from the main information depending on the priority of the main information selected by the comparison result with the main information condition table.

For example, referring to FIG. 11, when the number of information items to be included in the natural language response is limited to two and three information items are included in the main information 1100 as shown in the main information 1100 of FIG. 11, the electronic device 200 may exclude some items from the main information 1100 based on a priority. For example, in the case of FIG. 11, the value of the weather field 1101 having a priority lower than other information having the first priority may be excluded from the main information. The electronic device 200 may generate and output a natural language response based on the main information 1110 obtained by excluding an item having a low priority. When all three main information have the same priority, the electronic device 200 may randomly exclude a piece of information from the main information.

Figure 12:
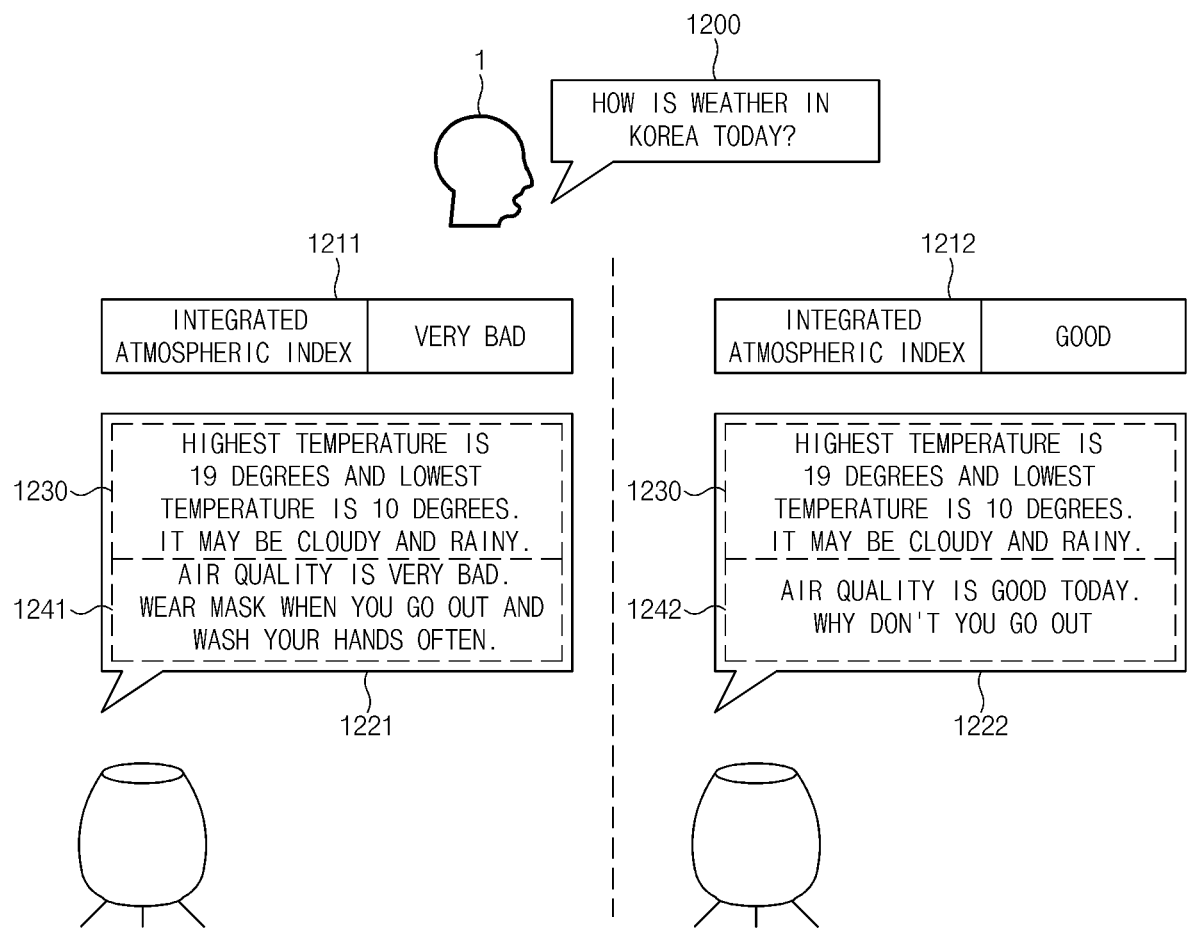
FIG. 12 illustrates an electronic device outputting a natural language response when there is only one field of data including main information according to an embodiment of the disclosure.

FIG. 12 illustrates an electronic device outputting a natural language response when there is only one field of data including main information according to an embodiment of the disclosure.

Referring to FIG. 12, when a user 1 has a user utterance 1200 of "how is the weather in Korea today", the electronic device 200 may grasp the intent of the user utterance 1200, may collect information, and may select main information from the collected information.

Upon receiving a user utterance 1200, when the main information 1211 including a value (very bad) of one field (integrated atmospheric index) is selected by the electronic device 200, the electronic device 200 may output a natural language response 1221 including a basic sentence 1230, which is generated using a basic template, and a partial sentence 1241 generated in response to the main information 1211.

Upon receiving a user utterance 1200, when the main information 1212 including a value (good) of one field (integrated atmospheric index) is selected by the electronic device 200, the electronic device 200 may output a natural language response 1222 including a basic sentence 1230, which is generated using a basic template, and a partial sentence 1242 generated in response to the main information 1212.

Figure 13:
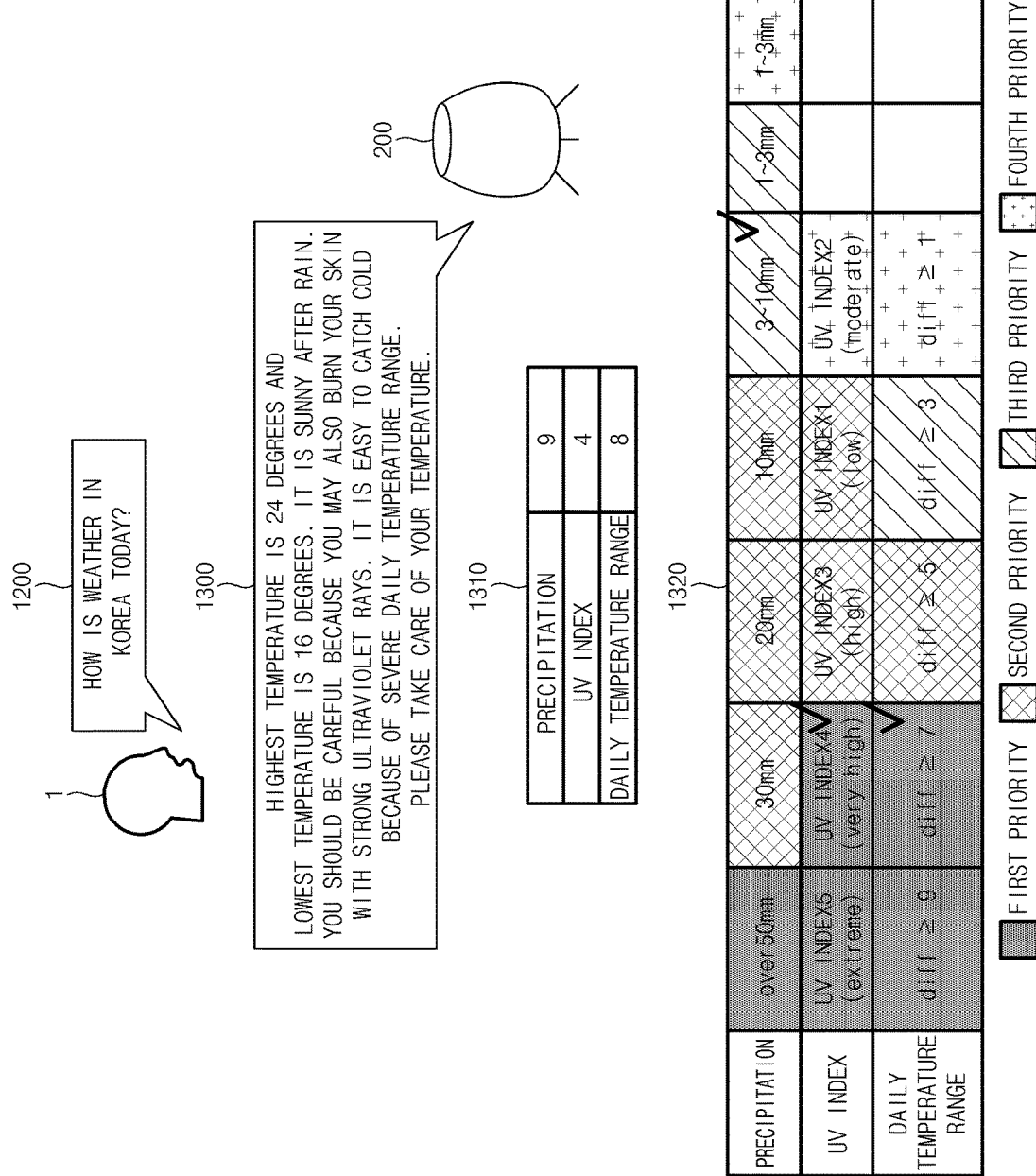
FIG. 13 illustrates an electronic device outputting a natural language response when there are a plurality of fields of data including main information according to an embodiment of the disclosure.

FIG. 13 illustrates an electronic device outputting a natural language response when there are a plurality of fields of data including main information according to an embodiment of the disclosure. More specifically, Referring to FIG. 13, an operation where the electronic device 200 outputs a response when main information 1310 is selected as an event in which a user utterance 1200 of the user 1 is received occurs is illustrated.

As illustrated in FIG. 13, when the main information 1310 includes information about 'precipitation', 'UV Index', and 'daily temperature range', the electronic device 200 may determine the priority of each item based on the main information condition table 1320. Referring to FIG. 13, the priority regarding 'UV Index' and 'daily temperature range' may belong to the range of the first priority; the priority regarding 'precipitation' may belong to the range of the third priority. Accordingly, the electronic device 200 may output a natural language response 1300 generated based on main information about 'UV Index' and 'daily temperature range', other than information about 'precipitation' belonging to the range of the third priority.

Figure 14:
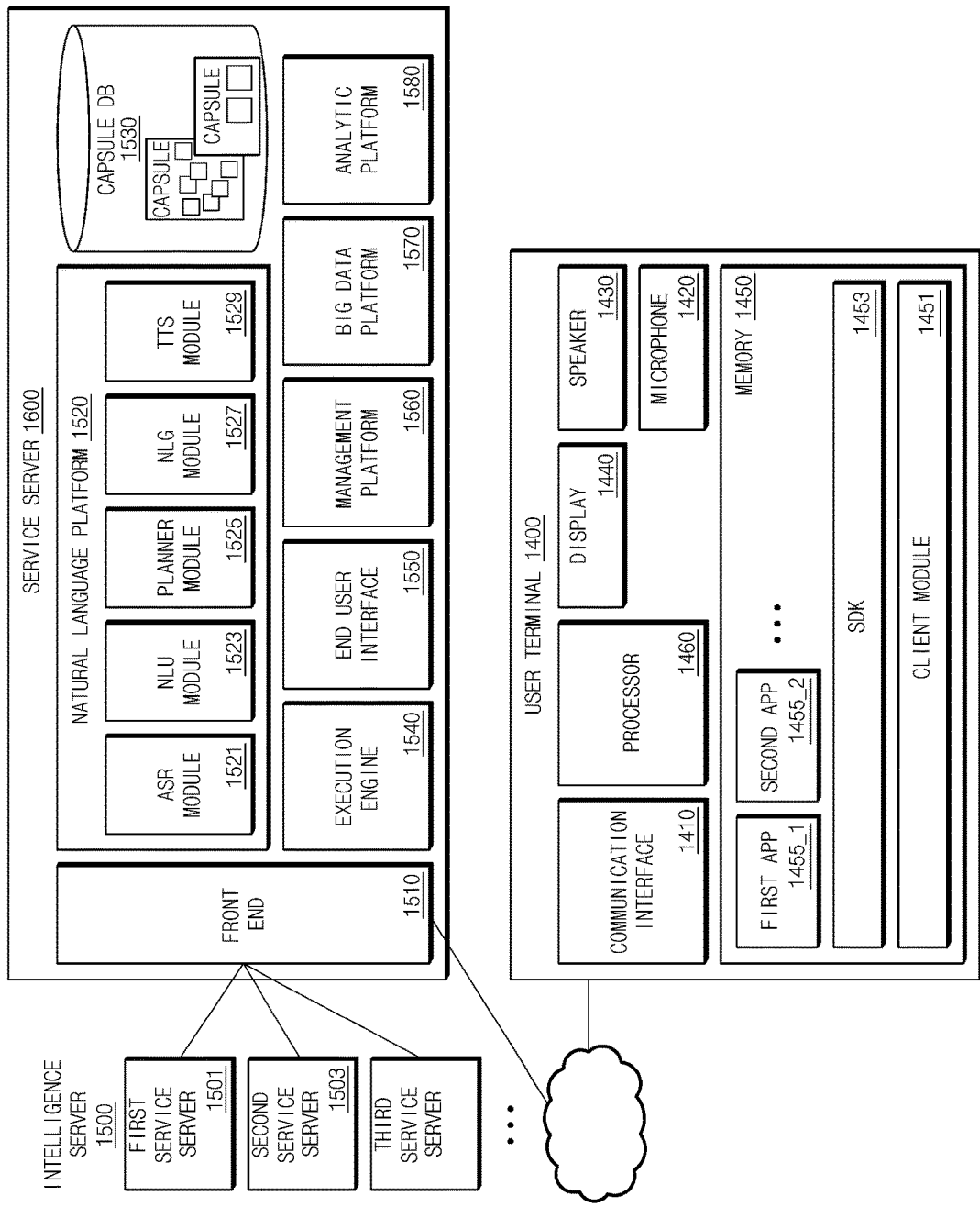
FIG. 14 is a block diagram illustrating an integrated intelligence system according to an embodiment of the disclosure.

FIG. 14 is a block diagram illustrating an integrated intelligence system according to an embodiment of the disclosure.

Referring to FIG. 14, according to an embodiment of the disclosure, an integrated intelligence system may include a user terminal (e.g., the electronic device 101 of FIG. 1 or the electronic device 200 of FIG. 2), an intelligence server 1500 (e.g., the server 108 of FIG. 1), and a service server 1600.

The user terminal 1400 according to an embodiment may be a terminal device (or an electronic device) capable of connecting to Internet, and may be, for example, a mobile phone, a smartphone, a personal digital assistant (PDA), a notebook computer, TV, a white household appliance, a wearable device, a head-mounted display (HMD), or a smart speaker.

According to the illustrated embodiment of the disclosure, the user terminal 1400 may include a communication interface 1410, a microphone 1420, a speaker 1430, a display 1440, a memory 1450, or a processor 1460. The listed components may be operatively or electrically connected to one another.

The communication interface 1410 according to an embodiment may be configured to transmit or receive data to or from an external device. The microphone 1420 according to an embodiment may receive a sound (e.g., a user utterance) to convert the sound into an electrical signal. According to an embodiment of the disclosure, the speaker 1430 may output the electrical signal as a sound (e.g., voice). The display 1440 according to an embodiment may be configured to display an image or a video. The display 1440 according to an embodiment may display the graphic user interface (GUI) of the running app (or an application program).

The memory 1450 according to an embodiment may store a client module 1451, a software development kit (SDK) 1453, and a plurality of apps 1455. The client module 1451 and the SDK 1453 may constitute a framework (or a solution program) for performing general-purposed functions. Furthermore, the client module 1451 or the SDK 1453 may constitute the framework for processing a voice input.

In the memory 1450 according to an embodiment of the disclosure, the plurality of apps 1455 may be a program for performing the specified function. According to an embodiment of the disclosure, the plurality of apps 1455 may include a first app 1455_1 and a second app 1455_2. According to an embodiment of the disclosure, each of the plurality of apps 1455 may include a plurality of actions for performing the specified function. For example, the apps may include an alarm app, a message app, and/or a schedule app. According to an embodiment of the disclosure, the plurality of apps 1455 may be executed by the processor 1460 to sequentially execute at least part of the plurality of actions.

According to an embodiment of the disclosure, the processor 1460 may control overall actions of the user terminal 1400. For example, the processor 1460 may be electrically connected to the communication interface 1410, the microphone 1420, the speaker 1430, and the display 1440 to perform a specified action.

Moreover, the processor 1460 according to an embodiment may execute the program stored in the memory 1450 to perform the specified function. For example, according to an embodiment of the disclosure, the processor 1460 may execute at least one of the client module 1451 or the SDK 1453 to perform the following actions for processing a voice input. The processor 1460 may control the actions of the plurality of apps 1455 via the SDK 1453. The following actions described as the actions of the client module 1451 or the SDK 1453 may be the action by the execution of the processor 1460.

According to an embodiment of the disclosure, the client module 1451 may receive a voice input. For example, the client module 1451 may receive a voice signal corresponding to a user utterance detected via the microphone 1420. The client module 1451 may transmit the received voice input to the intelligence server 1500. The client module 1451 may transmit the state information of the user terminal 1400 together with the received voice input, to the intelligence server 1500. For example, the state information may be the execution state information of an app.

According to an embodiment of the disclosure, the client module 1451 may receive the result corresponding to the received voice input. For example, when the intelligence server 1500 is capable of calculating the result corresponding to the received voice input, the client module 1451 may receive the result corresponding to the received voice input. The client module 1451 may display the received result on the display 1440.

According to an embodiment of the disclosure, the client module 1451 may receive the plan corresponding to the received voice input. The client module 1451 may display the result of executing a plurality of actions of an app on the display 1440 depending on the plan. For example, the client module 1451 may sequentially display the execution result of a plurality of actions on a display. For another example, the user terminal 1400 may display only a part of results (e.g., the result of the last action) of executing a plurality of actions, on the display.

According to an embodiment of the disclosure, the client module 1451 may receive a request for obtaining information necessary to calculate the result corresponding to a voice input, from the intelligence server 1500. According to an embodiment of the disclosure, the client module 1451 may transmit the necessary information to the intelligence server 1500 in response to the request.

According to an embodiment of the disclosure, the client module 1451 may transmit information about the result of executing a plurality of actions depending on the plan, to the intelligence server 1500. The intelligence server 1500 may determine that the received voice input is processed correctly, using the result information.

According to an embodiment of the disclosure, the client module 1451 may include a voice recognition module. According to an embodiment of the disclosure, the client module 1451 may recognize a voice input to perform the limited function, via the voice recognition module. For example, the client module 1451 may launch an intelligence app that processes a voice input for performing an organic action, via a specified input (e.g., wake up!).

According to an embodiment of the disclosure, the intelligence server 1500 may receive the information associated with a user's voice input from the user terminal 1400 over a communication network. According to an embodiment of the disclosure, the intelligence server 1500 may change the data associated with the received voice input to text data. According to an embodiment of the disclosure, the intelligence server 1500 may generate a plan for performing a task corresponding to a user voice input, based on the text data.

According to an embodiment of the disclosure, the plan may be generated by an artificial intelligent (AI) system. The AI system may be a rule-based system, or may be a neural network-based system (e.g., a feedforward neural network (FNN) or a recurrent neural network (RNN)). Alternatively, the AI system may be a combination of the above-described systems or an AI system different from the above-described system. According to an embodiment of the disclosure, the plan may be selected from a set of predefined plans or may be generated in real time in response to a user request. For example, the AI system may select at least one plan of the plurality of predefined plans.

According to an embodiment of the disclosure, the intelligence server 1500 may transmit the result according to the generated plan to the user terminal 1400 or may transmit the generated plan to the user terminal 1400. According to an embodiment of the disclosure, the user terminal 1400 may display the result according to the plan, on a display. According to an embodiment of the disclosure, the user terminal 1400 may display the result of executing the action according to the plan, on the display.

The intelligence server 1500 according to an embodiment may include a front end 1510, a natural language platform 1520, a capsule database (DB) 1530, an execution engine 1540, an end UI 1550, a management platform 1560, a big data platform 1570, or an analytic platform 1580.

According to an embodiment of the disclosure, the front end 1510 may receive a voice input received from the user terminal 1400. The front end 1510 may transmit a response corresponding to the voice input to any one of a first service center 1501, a second service center 1503, and a third service center.

According to an embodiment of the disclosure, the natural language platform 1520 may include an automatic speech recognition (ASR) module 1521, a NLU module 1523, a planner module 1525, a NLG module 1527, or a text to speech module (TTS) module 1529.

According to an embodiment of the disclosure, the ASR module 1521 may convert the voice input received from the user terminal 1400 into text data. According to an embodiment of the disclosure, the NLU module 1523 may grasp the intent of the user, using the text data of the voice input. For example, the NLU module 1523 may grasp the intent of the user by performing syntactic analysis or semantic analysis. According to an embodiment of the disclosure, the NLU module 1523 may grasp the meaning of words extracted from the voice input by using linguistic features (e.g., syntactic elements), such as morphemes or phrases and may determine the intent of the user by matching the grasped meaning of the words to the intent.

According to an embodiment of the disclosure, the planner module 1525 may generate the plan by using the intent and a parameter, which are determined by the NLU module 1523. According to an embodiment of the disclosure, the planner module 1525 may determine a plurality of domains necessary to perform a task, based on the determined intent. The planner module 1525 may determine a plurality of actions included in each of the plurality of domains determined based on the intent. According to an embodiment of the disclosure, the planner module 1525 may determine the parameter necessary to perform the determined plurality of actions or the result value output by the execution of the plurality of actions. The parameter and the result value may be defined as a concept of the specified form (or class). As such, the plan may include the plurality of actions and a plurality of concepts determined by the intent of the user. The planner module 1525 may determine the relationship between the plurality of actions and the plurality of concepts stepwise (or hierarchically). For example, the planner module 1525 may determine the execution sequence of the plurality of actions, which are determined based on the user's intent, based on the plurality of concepts. In other words, the planner module 1525 may determine the execution sequence of the plurality of actions, based on the parameters necessary to perform the plurality of actions and the result output by the execution of the plurality of actions. As such, the planner module 1525 may generate a plan including information (e.g., ontology) of the relationship between a plurality of actions and a plurality of concepts. The planner module 1525 may generate the plan, using the information stored in the capsule DB 1530 storing a set of relationships between concepts and actions.

According to an embodiment of the disclosure, the NLG module 1527 may change the specified information into information in the text form. The information changed to the text form may be in the form of a natural language speech. The TTS module 1529 according to an embodiment may change information in the text form to information in a voice form.

According to an embodiment of the disclosure, all or part of the functions of the natural language platform 1520 may be also implemented in the user terminal 1400.

The capsule DB 1530 may store information about the relationship between the actions and the plurality of concepts corresponding to a plurality of domains. According to an embodiment of the disclosure, the capsule may include a plurality of action objects (or action information) and concept objects (or concept information) included in the plan. According to an embodiment of the disclosure, the capsule DB 1530 may store the plurality of capsules in the form of a concept action network (CAN). According to an embodiment of the disclosure, the plurality of capsules may be stored in the function registry included in the capsule DB 1530.

The capsule DB 1530 may include a strategy registry that stores strategy information necessary to determine a plan corresponding to a voice input. The strategy information may include reference information for determining a single plan when there are a plurality of plans corresponding to the voice input. According to an embodiment of the disclosure, the capsule DB 1530 may include a follow-up registry that stores the information of the follow-up action for suggesting a follow-up action to the user in the specified context. For example, the follow-up action may include a follow-up utterance. According to an embodiment of the disclosure, the capsule DB 1530 may include a layout registry for storing layout information of the information output via the user terminal 1400. According to an embodiment of the disclosure, the capsule DB 1530 may include a vocabulary registry that stores vocabulary information included in the capsule information. According to an embodiment of the disclosure, the capsule DB 1530 may include a dialog registry that stores information about dialog (or interaction) with the user. The capsule DB 1530 may update the object stored via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that creates a dialog with the user. The developer tool may include a follow-up editor capable of activating the follow-up target and editing the follow-up utterance for providing a hint. The follow-up target may be determined based on the currently set target, the preference of the user, or environment condition. The capsule DB 1530 according to an embodiment may be also implemented in the user terminal 1400.

According to an embodiment of the disclosure, the execution engine 1540 may calculate the result, using the generated plan. The end UI 1550 may transmit the calculated result to the user terminal 1400. As such, the user terminal 1400 may receive the result and may provide the user with the received result. According to an embodiment of the disclosure, the management platform 1560 may manage information used by the intelligence server 1500. According to an embodiment of the disclosure, the big data platform 1570 may collect data of the user. According to an embodiment of the disclosure, the analytic platform 1580 may manage the quality of service (QoS) of the intelligence server 1500. For example, the analytic platform 1580 may manage the component and processing speed (or efficiency) of the intelligence server 1500.

According to an embodiment of the disclosure, the service server 1600 may provide the user terminal 1400 with a specified service (e.g., food order or hotel reservation). According to an embodiment of the disclosure, the service server 1600 may be a server operated by the third party. According to an embodiment of the disclosure, the service server 1600 may provide the intelligence server 1500 with information for generating a plan corresponding to the received voice input. The provided information may be stored in the capsule DB 1530. Furthermore, the service server 1600 may provide the intelligence server 1500 with result information according to the plan.

In the above-described integrated intelligence system, the user terminal 1400 may provide the user with various intelligent services in response to a user input. The user input may include, for example, an input through a physical button, a touch input, or a voice input.

According to an embodiment of the disclosure, the user terminal 1400 may provide a speech recognition service via an intelligence app (or a speech recognition app) stored therein. In this case, for example, the user terminal 1400 may recognize the user utterance or the voice input received via the microphone and may provide the user with a service corresponding to the recognized voice input.

According to an embodiment of the disclosure, the user terminal 1400 may perform a specified action, based on the received voice input, independently, or together with the intelligence server and/or the service server. For example, the user terminal 1400 may execute an app corresponding to the received voice input and may perform the specified action via the executed app.

According to an embodiment of the disclosure, when the user terminal 1400 provides a service together with the intelligence server 1500 and/or the service server, the user terminal may detect a user utterance, using the microphone 1420 and may generate a signal (or voice data) corresponding to the detected user utterance. The user terminal may transmit the voice data to the intelligence server 1500, using the communication interface 1410.

According to an embodiment of the disclosure, the intelligence server 1500 may generate a plan for performing a task corresponding to the voice input or the result of performing an action depending on the plan, as the response to the voice input received from the user terminal 1400. For example, the plan may include a plurality of actions for performing the task corresponding to the voice input of the user and a plurality of concepts associated with the plurality of actions. The concept may define a parameter to be input for the execution of the plurality of actions or a result value output by the execution of the plurality of actions. The plan may include relationship information between a plurality of actions and a plurality of concepts.

According to an embodiment of the disclosure, the user terminal 1400 may receive the response, using the communication interface 1410. The user terminal 1400 may output the voice signal generated in user terminal 1400, to the outside using the speaker 1430 or may output an image generated in the user terminal 1400, to the outside using the display 1440.

Figure 15:
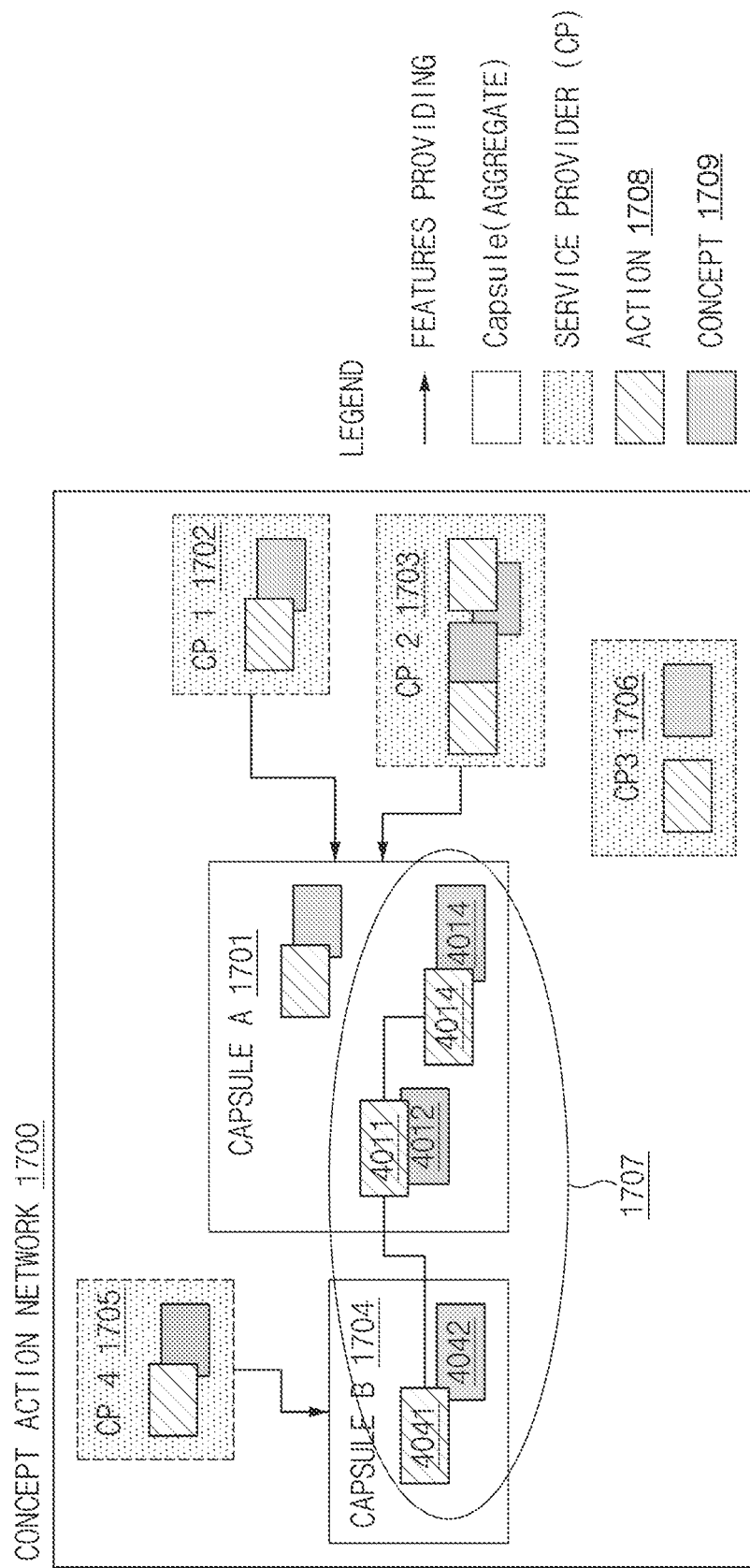
FIG. 15 is a diagram illustrating a form in which relationship information between a concept and an action is stored in a database according to an embodiment of the disclosure.

FIG. 15 is a diagram illustrating a form in which relationship information between a concept and an action is stored in a database according to an embodiment of the disclosure.

Referring to FIG. 15, the capsule database (e.g., a capsule DB 1530) of the intelligence server 1500 may store a capsule in the form of a CAN. The capsule database may store an action for processing a task corresponding to a voice input and a parameter necessary for the action, in the CAN form.

The capsule database may store a plurality capsules capsule (A) 1701 and capsule (B) 1704 respectively corresponding to a plurality of domains (e.g., applications). According to an embodiment of the disclosure, a single capsule (e.g., the capsule (A) 1701) may correspond to one domain (e.g., a location (geo) or an application). Furthermore, at least one service provider (e.g., CP 1 1702, CP 2 1703, CP 2 1705, or CP 2 1706) for performing the function for the domain associated with the capsule may correspond to the single capsule. According to an embodiment of the disclosure, the single capsule may include at least one or more actions 1708 and at least one or more concepts 1709 for performing a specified function.

The natural language platform 1520 may generate a plan for performing a task corresponding to the received voice input, using the capsule stored in the capsule database. For example, the planner module 1525 of the natural language platform may generate a plan, using the capsule stored in the capsule database. For example, the planner module 1525 may generate a plan 1707, using actions 4011 and 4013 and concepts 4012 and 4014 of the capsule (A) 1701 and an action 4041 and a concept 4042 of the capsule (B) 1704.

Figure 16:
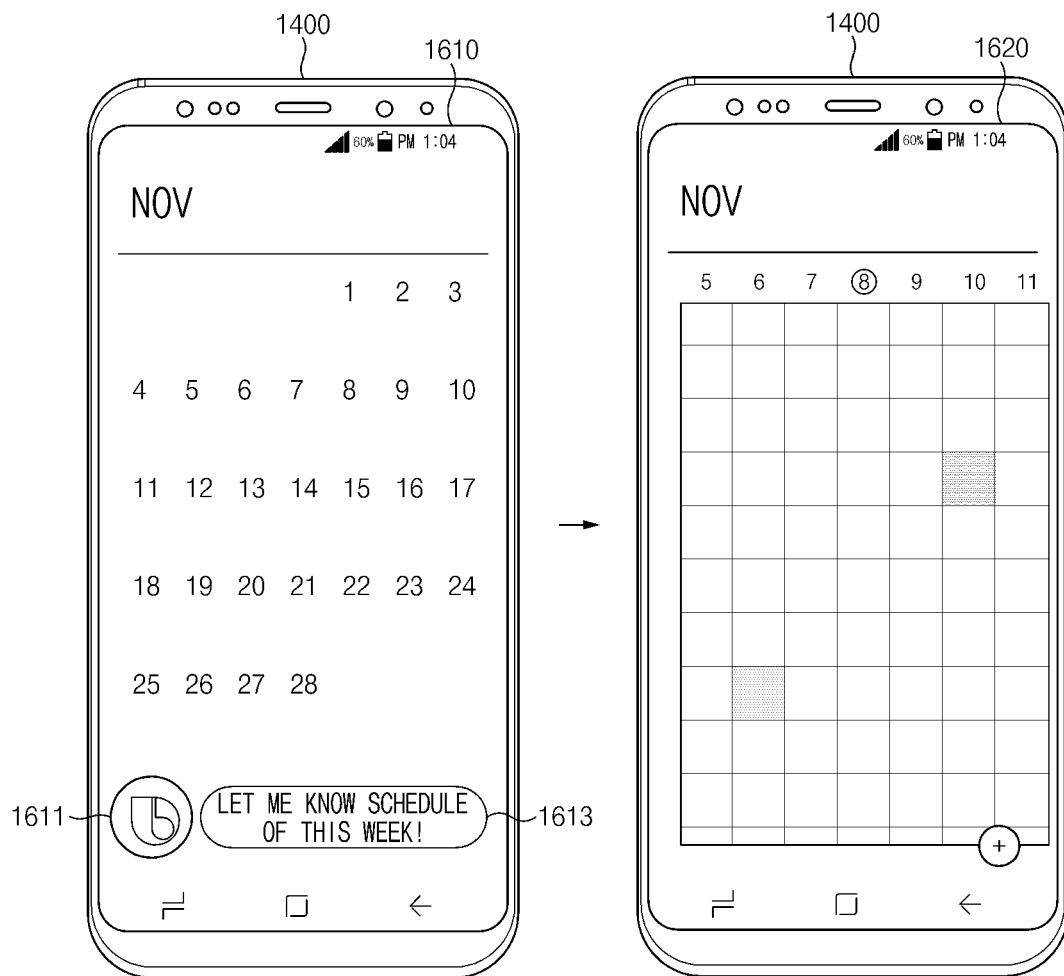
FIG. 16 is a view illustrating a user terminal displaying a screen of processing a voice input received through an intelligence app according to an embodiment of the disclosure.

FIG. 16 is a view illustrating a screen in which a user terminal processes a voice input received through an intelligence app according to an embodiment of the disclosure.

Referring to FIG. 16, the user terminal 1400 may execute an intelligence app to process a user input through the intelligence server 1500.

According to an embodiment of the disclosure, in screen 1610, when recognizing a specified voice input (e.g., wake up!) or receiving an input via a hardware key (e.g., the dedicated hardware key), the user terminal 1400 may launch an intelligence app for processing a voice input. For example, the user terminal 1400 may launch an intelligence app in a state where a schedule app is being executed. According to an embodiment of the disclosure, the user terminal 1400 may display an object (e.g., an icon) 1611 corresponding to the intelligence app, on the display 1440. According to an embodiment of the disclosure, the user terminal 1400 may receive a voice input by a user utterance. For example, the user terminal 1400 may receive a voice input saying that "Let me know the schedule of this week!". According to an embodiment of the disclosure, the user terminal 1400 may display a UI 1613 (e.g., an input window) of an intelligence app, in which text data of the received voice input is displayed, on a display According to an embodiment of the disclosure, in screen 1620, the user terminal 1400 may display the result corresponding to the received voice input, on the display. For example, the user terminal 1400 may receive the plan corresponding to the received user input and may display 'the schedule of this week' on the display depending on the plan.

Figure 17:
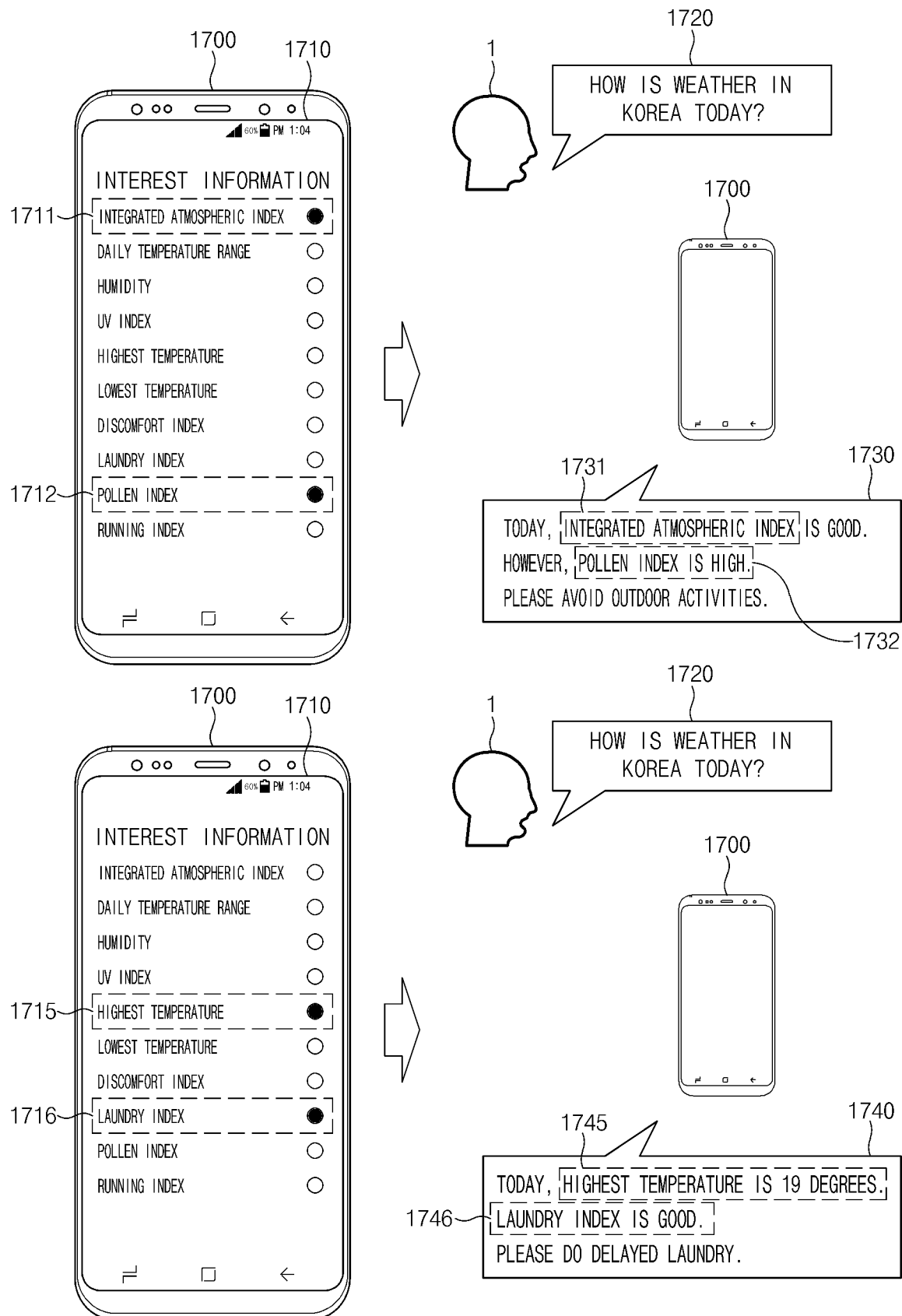
FIG. 17 illustrates an electronic device selects main information and outputs a natural language response according to an embodiment of the disclosure.

FIG. 17 illustrates an electronic device selects main information and outputs a natural language response according to an embodiment of the disclosure.

Referring to FIG. 17, an electronic device 1700 (e.g., electronic device 101 of FIG. 1 or the electronic device 200 of FIG. 2) may obtain information about the information item selected by a user. For example, the electronic device 1700 may obtain information about the selected information item based on a user input entered by a user into the electronic device 1700 to select the information item. More specifically, the electronic device 1700 may receive a user input through a GUI for displaying an information list or may receive a voice corresponding to the information item. For another example, the electronic device 1700 may obtain information about an information item selected by the user, from another device (e.g., the electronic device 102, the electronic device 104, or the server 108 of FIG. 1).

Referring to FIG. 17, an electronic device 1700 may select an information item using a graphical UI 1710 including an information list. When an integrated atmospheric index information item 1711 and a pollen index information item 1712 are selected from the information list, the electronic device 1700 may set the priority of each of the integrated atmospheric index information item 1711 and the pollen index information item 1712, as the first priority. Afterward, when an utterance 1720 of "how is the weather in Korea today?" of the user 1 is received, the electronic device may select information corresponding to the integrated atmospheric index information item 1711 and the pollen index information item 1712 as main information based on the specified priority.

For example, when an information acquisition module (e.g., the information acquisition module 420 of FIG. 4) receives information belonging to a weather domain from a content provider (e.g., the content provider 408 of FIG. 4), the main information selector (e.g., the main information selector 430 of FIG. 4) may select, as main information, information corresponding to the integrated atmospheric index information item 1711 and the pollen index information item 1712 from the received information.

The electronic device 1700 may output a response 1730 including the integrated atmospheric index information 1731 and the pollen index information 1732, as the response to the received utterance 1720.

For example, when a highest temperature information item 1715 and a laundry index item 1716 are selected, the electronic device 1700 may select information corresponding to the highest temperature information item 1715 and the laundry index item 1716 as the main information based on the designated priority. In this case, the electronic device 1700 may output a response 1740 including highest temperature information 1745 and laundry index information 1746 with respect to the same utterance 1720 of the user 1.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the specification, because an electronic device dynamically selects a criterion for selecting information to be included in a response depending on an event or user context, the electronic device may dynamically generate a response suitable for the user.

Furthermore, according to embodiments disclosed in the specification, the electronic device may select the information suitable for the response from the collected information.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an output device;
at least one processor operatively connected to the output device; and
a memory operatively connected to the at least one processor,
wherein the memory is configured to store a plurality of candidate condition tables,
wherein the memory is further configured to store instructions that, when executed, cause the at least one processor to:
detect occurrence of an event,
determine a query corresponding to the event in response to the occurrence of the event,
obtain raw data based on at least part of the determined query,
determine a main information condition table from among the plurality of candidate condition tables, based on context information associated with the event, for defining a priority condition,
determine the priority condition for selecting data from among the obtained raw data, based on the context information associated with the event and based on the main information condition table,
select main information from the obtained raw data, based on the priority condition, and
output a natural language response generated based on the selected main information, through the output device, and
wherein the main information condition table comprises at least one data field item and a priority determination condition corresponding to the respective at least one data field item.

2. The electronic device of claim 1, wherein the instructions further cause the at least one processor to:

determine a main information candidate list including at least one value corresponding to the at least one data field item, and
select the main information among the at least one value based on the priority determination condition.

3. The electronic device of claim 2, wherein the instructions further cause the at least one processor to:
compare the at least one value with the priority determination condition,
determine a priority for the at least one value, based on a result of the comparison, and
select the main information among the at least one value based on the determined priority.

4. The electronic device of claim 3, wherein the instructions further cause the at least one processor to:
when a number of fields of data including the main information exceeds a specified value, exclude a value of at least one field from the selected main information, based on the determined priority.

5. The electronic device of claim 1, further comprising: an input device,
wherein the event comprises entering a natural language input via the input device, and
wherein the instructions further cause the at least one processor to:
determine an intent corresponding to the natural language input, and
determine a parameter for constituting the query based on the determined intent.

6. The electronic device of claim 1, wherein the context information comprises at least one of user information indicating a feature of a user of the electronic device, time information associated with a point in time when the event occurs, or place information indicating a location of the electronic device.

7. The electronic device of claim 1, further comprising:
a communication circuit configured to communicate with an external electronic device,
wherein the instructions further cause the at least one processor to:
transmit the query to the external electronic device via the communication circuit, and
parse an electronic document received as a response to the query to determine the raw data.

8. The electronic device of claim 1, wherein the instructions further cause the at least one processor to:
select a response template corresponding to the event, and
enter the selected main information into the response template to generate the natural language response.

9. The electronic device of claim 8, wherein the response template comprises a value token capable of being replaced with the main information and a template token branched depending on the context information.

10. A method in which an electronic device provides a natural language response, the method comprising:
detecting an occurrence of an event;
determining a query corresponding to the event as a response to the occurrence of the event;
obtaining raw data based on at least part of the query;
determining a main information condition table, from among a plurality of candidate condition tables, based on context information associated with the event, for defining a priority condition;
determining the priority condition for selecting data, from among the obtained raw data, based on context information associated with the event and based on the main information condition table;
selecting main information from the raw data, based on the priority condition; and
outputting a natural language response generated based on the selected main information,
wherein the main information condition table comprises at least one data field item and a priority determination condition corresponding to the respective at least one data field item.

11. The method of claim 10, wherein the selecting of the main information comprises:
determining a main information candidate list including at least one value corresponding to the at least one data field item; and
selecting the main information among the at least one value based on the priority determination condition.

12. The method of claim 11, wherein the selecting of the main information among the at least one value comprises:
comparing the at least one value with the priority determination condition;
determining a priority for the at least one value, based on a result of the comparison; and
selecting the main information among the at least one value based on the determined priority.

13. The method of claim 12, further comprising:
when a number of fields of data including the main information exceeds a specified value, excluding a value of at least one field from the selected main information, based on the determined priority.

14. The method of claim 10,
wherein the detecting of the occurrence of the event comprises:
receiving a natural language input corresponding to the event, and
wherein the determining of the query comprises:
determining an intent corresponding to the natural language input, and
determining a parameter for constituting the query based on the determined intent.

15. The method of claim 10, wherein the context information comprises at least one of user information indicating a feature of a user of the electronic device, time information associated with a point in time when the event occurs, or place information indicating a location of the electronic device.

16. The method of claim 10, wherein the outputting of the natural language response comprises:
selecting a response template corresponding to the event; and
entering the selected main information into the response template to generate the natural language response.

17. At least one non-transitory computer-readable recording medium having recorded thereon a computer program for executing a method, the method comprising:
detecting an occurrence of an event;
determining a query corresponding to the event as a response to the occurrence of the event;
obtaining raw data based on at least part of the query;
determining a main information condition table from among a plurality of candidate condition tables, based on context information associated with the event, for defining a priority condition,
determining the priority condition for selecting data, from among the obtained raw data, based on context information associated with the event and based on the main information condition table;
selecting main information from the raw data, based on the priority condition; and outputting a natural language response generated based on the selected main information, wherein the main information condition table comprises at least one data field item and a priority determination condition corresponding to the respective at least one data field item.

18. The at least one non-transitory computer-readable recording medium of claim 17, wherein the context information comprises user information including one of age, personality, hobby, or occupation.

* * * * *